US011704516B2

(12) United States Patent
Seo et al.

(10) Patent No.: US 11,704,516 B2
(45) Date of Patent: Jul. 18, 2023

(54) ELECTRONIC LABEL MANAGEMENT APPARATUS AND METHOD

(71) Applicant: SOLUM CO., LTD., Yongin-si (KR)

(72) Inventors: Bo Il Seo, Suwon-si (KR); Hyun Suk Lee, Suwon-si (KR)

(73) Assignee: SOLUM CO., LTD., Yongin-si (KR)

( * ) Notice: Subject to any disclaimer, the term of this patent is extended or adjusted under 35 U.S.C. 154(b) by 267 days.

(21) Appl. No.: 16/898,411

(22) Filed: Jun. 10, 2020

(65) Prior Publication Data
US 2020/0394939 A1 Dec. 17, 2020

(30) Foreign Application Priority Data

Jun. 11, 2019 (KR) .......................... 10-2019-0068379
May 11, 2020 (KR) .......................... 10-2020-0056209

(51) Int. Cl.
| | | |
|---|---|---|
| G06K 7/14 | (2006.01) | |
| G09F 3/20 | (2006.01) | |
| G06Q 10/087 | (2023.01) | |
| G06Q 30/06 | (2023.01) | |

(52) U.S. Cl.
CPC ......... *G06K 7/1447* (2013.01); *G06K 7/1443* (2013.01); *G06Q 10/087* (2013.01); *G09F 3/208* (2013.01); *G06Q 30/06* (2013.01)

(58) Field of Classification Search
CPC .............................. G06Q 10/087; G09F 3/208
USPC ............................................ 235/385; 705/28
See application file for complete search history.

(56) References Cited

U.S. PATENT DOCUMENTS

| | | | |
|---|---|---|---|
| 8,698,606 B2 | 4/2014 | Choi et al. | |
| 9,911,290 B1* | 3/2018 | Zalewski | ........... G06Q 30/0633 |
| 2008/0077511 A1* | 3/2008 | Zimmerman | ........ G06Q 10/087 |
| | | | 705/28 |
| 2014/0316901 A1 | 10/2014 | Grabovski et al. | |
| 2017/0278057 A1 | 9/2017 | Itou et al. | |
| 2017/0293959 A1* | 10/2017 | Itou | ..................... G06Q 30/0623 |

(Continued)

FOREIGN PATENT DOCUMENTS

| | | |
|---|---|---|
| CN | 108846449 A | 11/2018 |
| KR | 10-1583087 B1 | 1/2016 |

(Continued)

OTHER PUBLICATIONS

Extended European Search Report dated Nov. 13, 2020 for European Application No. 20179219.9.

*Primary Examiner* — Suezu Ellis
(74) *Attorney, Agent, or Firm* — Insight Law Group, PLLC; Seung Lee

(57) ABSTRACT

Disclosed is computing technology for managing information display of an electronic label which is connected to a management server via a network and displays electronic information. A moving device transmits images, which are obtained by photographing an electronic label and a product while being moved in a store, to a management server. The management server analyzes the images to extract information and detects changes in displayed products to register changed information. The management server performs inventory management using the extracted information. Further, the management server uses the extracted information to inform a store manager so that a location of a displayed product deviated from a place thereof is corrected.

9 Claims, 5 Drawing Sheets

(56) References Cited

U.S. PATENT DOCUMENTS

2019/0087772 A1* 3/2019 Medina ................ B64C 39/024
2020/0286135 A1* 9/2020 Matayoshi .............. G09F 3/204

FOREIGN PATENT DOCUMENTS

| WO | 2015/140851 A1 | 9/2015 |
| WO | 2015/140852 A1 | 9/2015 |

* cited by examiner

ELECTRONIC LABEL MANAGEMENT APPARATUS AND METHOD

CROSS-REFERENCE TO RELATED APPLICATION(S)

This application claims priority from Korean Patent Application No. 10-2019-0068379, filed on Jun. 11, 2019 and Korean Patent Application No. 10-2020-0056209, filed on May 11, 2020, in the Korean Intellectual Property Office, the disclosure of which is incorporated herein by reference in its entirety.

BACKGROUND

1. Field

Embodiments of the present invention relate to computing technology for managing an electronic label, which is connected to a management server via a network and displays electronic information, in particular, information display of the electronic label.

2. Description of Related Art

The use of electronic labels is gradually increasing in applications such as an application for displaying pieces of product information of products displayed in stores. Electronic labels, which are referred to as electronic shelf labels or electronic tags, are connected to a management server via a gateway, receive product information to be displayed, and display the received product information on electronic paper displays. The use of electronic labels is gradually increasing because the electronic labels can be operated at low power so that batteries thereof can be used for a long time, and displayed information can be changed through a communication network so that employment costs for store management can be reduced.

When a new product is displayed, there is a need for a procedure for assigning an electronic label to the product so that the electronic label displays information of the product. Generally, a store manager reads a barcode attached on an electronic label using a terminal and then reads a barcode of a product, and transmits the resultant to a management server, and the management server assigns the corresponding electronic label to the product, registers the electronic label and the product in a database, transmits product information of the product to the electronic label, and processes so that the display of the information of the product is changed. The process of assigning thousands to tens of thousands of electronic labels requires a great amount of cost and time. And a lifetime of a battery of the electronic label is shortened, it is impossible to operate the battery.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to a technique for automating initial assignment or re-assignment of an electronic label.

Furthermore, embodiments of the present invention relate to a technique for automating an assignment process while maintaining a lifetime of a battery of an electronic label.

Furthermore, embodiments of the present invention relate to a technique for reducing costs of human resources involved in managing displayed products.

In one general aspect, a moving device transmits images, which are obtained by photographing an electronic label and a product while being moved in a store, to a management server. The management server analyzes the images to extract product identification information and updates product identification information matching electronic label identification information associated with the image.

In another general aspect, the management server may analyze the images to extract information and detect changes in displayed products to register changed information.

In still another general aspect, when the electronic label associated with the image is in an unassigned state, the identified product identification information may be assigned by matching the identified product identification information with the identification information of the corresponding electronic label.

In yet another general aspect, the management server may analyze the image using a pre-trained artificial intelligence engine and extract the information.

In yet another general aspect, the management server may perform inventory management using the extracted information.

In yet another general aspect, the management server may use the extracted information to inform a store manager so that a location of a displayed product deviated from a place thereof is corrected.

Other features and aspects will be apparent from the following detailed description, the accompanying drawings, and the claims.

Figure 1:
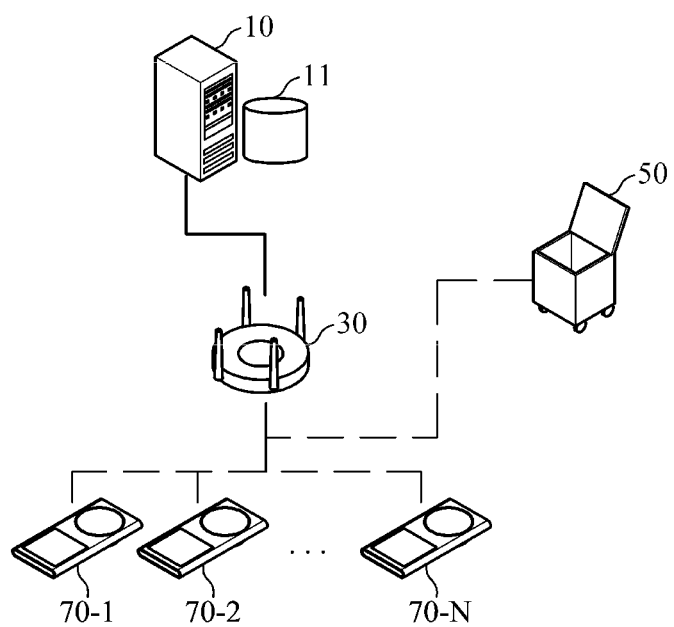
FIG. 1 illustrates a configuration of an exemplary electronic label system employing an electronic label management apparatus according to an embodiment of the present invention.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above-described and additional aspects are embodied through embodiments described with reference to the accompanying drawings. It will be understood that components of each of the embodiments may be combined in various ways within one embodiment unless otherwise stated or there is a contradiction between them.

FIG. 1 is illustrates a configuration of an exemplary electronic label system employing an electronic label management apparatus according to an embodiment of the present invention.

Referring to FIG. 1, the exemplary electronic label system includes a management server 10 including a management database 11 in which management information is stored, one or more gateways 30, which are connected to the management server 10 via a network, for example, Ethernet, a plurality of electronic labels 70-1 to 70-N, which are grouped for each gateway and connected to the corresponding gateway, and a moving device 50 which is connected to the management server 10 via a wireless network. Gateways are installed on a ceiling of a store in consideration of a wireless environment. Thousands of electronic labels may be connected to one gateway. The gateway 30 may communicate with the electronic labels 71-0 to 70-N of the group belonging to the gateway 30 according to short range wireless communication protocols.

According to an aspect, the moving device 50 is provided. The moving device 50 transmits images, which are obtained by photographing an electronic label and a product while being moved in a store, to the management server 10. The moving device 50 may be, for example, a cart. A camera may be attached to a cart used by customers in the store, and images captured by the camera may be transmitted to the management server 10 through the gateway 30. As another example, the moving device 50 may be in the form of a separate traveling robot. As still another example, the moving device 50 may be a flying object such as a drone. In the illustrated embodiment, the moving device 50 is illustrated as sharing the gateway 30 used by the electronic label, but may use a gateway 30 that is physically one object but additionally has a modem for another protocol, or the moving device 50 may use a separate channel using the same protocol. As yet another example, a separate gateway may be installed.

The proposed invention may be implemented as a computer program executed on the management server 10. The management server 10 is connected to the moving device 50 and the plurality of electronic labels 71-0 to 70-N via a wired and/or wireless network. The management server 10 manages pieces of identification information of electronic labels, pieces of identification information of products displayed by the electronic labels, and pieces of information of the products to be displayed. The management server 10 analyzes the images received from the moving device 50 to extract information and detects changes in displayed products to register changed information.

Figure 2:
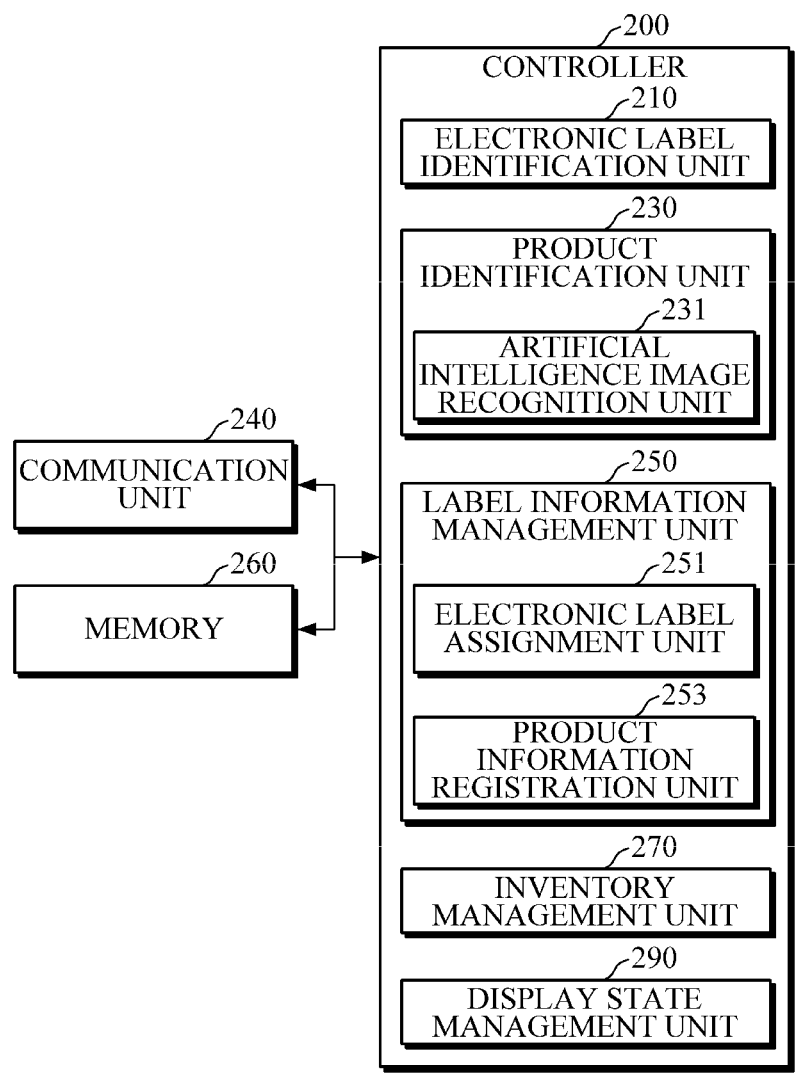
FIG. 2 is a block diagram illustrating a configuration of an electronic label management apparatus according to an embodiment.

FIG. 2 is a block diagram illustrating a configuration of the electronic label management apparatus according to the embodiment.

Referring to FIG. 2, each block may refer to a functional collection of instructions of the computer program executed on the management server 10 of FIG. 1. Each block may be implemented as a single program sub-module during a program implementation process or may be distributed to multiple modules to implement a single function.

As illustrated above, the electronic label management apparatus according to the embodiment includes a controller 200, a communication unit 240, and a memory 260. The controller 200 may include one or more microprocessors and control logic. The memory 260 may include a semiconductor memory and a large capacity memory such as a hard disk. In an embodiment, the communication unit 240 may be a network interface that supports Ethernet.

According to an aspect, the electronic label management apparatus includes a product identification unit 230 and a label information management unit 250. The product identification unit 230 recognizes identification information of a product from images of products, which are captured in the vicinity of an electronic label, among the images received from the moving device, and matches the recognized identification information of the product with identification information of the electronic label to output the identification information of the product. The product identification unit 230 identifies the products from the previously received images and segments each product to extract a plurality of product images. Subsequently, the product identification unit 230 processes the images of each product to extract the product identification information. Subsequently, the product identification unit 230 gathers and outputs the pieces of extracted product identification information to the identification information of the electronic label.

When there are a plurality of product images which are captured in the vicinity of a specific electronic label among the images received from the moving device, the product identification unit 230 identifies segmentation images, which are obtained by photographing the same product among the segmented product images, from the plurality of product images. According to an aspect, the product identification unit 230 may select the best image among the plurality of segmentation images obtained by photographing the same product to identify the product. As another example, the product identification unit 230 may identify the product from all of the plurality of segmentation images obtained by photographing the same product and compare results thereof to determine the product identification information.

According to an aspect, the product identification unit 230 uses images obtained by photographing the corresponding product at various angles in advance to increase a recognition rate. For example, when the product image extracted from the captured images includes only a portion of the product, the product identification unit 230 may search for an image including an entire shape of the product while including the portion and select the best matching image. As another example, when the product image extracted from the captured images is blurred, the product identification unit 230 may search for a clear image including the product and select the best matching image. Instead of the image received from the moving device, the selected image may be recognized, thereby increasing a recognition rate and increasing an amount of information recognized. Searching for a partially or entirely similar image is more accurate than image recognition and uses a small amount of data, and thus the image may be efficiently processed.

As still another example, the product identification unit 230 first extracts text information from the product image. When the extracted text information includes the product identification information, the extraction is successful. Otherwise, the extracted text information is used to search for the images in the management database of the memory 260 to search for the matching products. When the plurality of products are found, the product information of the best matching product image is selected by matching the product image with the stored images for the products to be compared.

According to an additional aspect, the product identification unit 230 may include an artificial intelligence image recognition unit 231. For example, the artificial intelligence image recognition unit 231 may be implemented as a convolutional neural network (CNN). The artificial intelligence image recognition unit 231 is trained in advance using the images obtained by photographing the corresponding product at various angles. Additionally, the artificial intelligence image recognition unit 231 may be trained in advance using the images obtained by photographing only some portions of various portions of the product. When the artificial intelligence image recognition unit 231 is trained using the images obtained by partially or entirely photographing the products to be displayed and using the pieces of identification information of the images, products that are excluded from being displayed are learned and classified in a limited domain, and thus reliability of classification may be increased. The artificial intelligence image recognition unit 231 may use the product image for each product, which is extracted from the images received from the moving device, as an input and thus may output a probability of matching the product identification information.

The label information management unit 250 updates the product identification information matching the identification information of the corresponding electronic label using the product identification information identified in the product identification unit 230 and processes the product information corresponding to the updated product identification information to be transmitted to the corresponding electronic label.

According to an aspect, the label information management unit 250 may include a product information registration unit 253. When the product identification information identified in the product identification unit 230 is different from the product identification information previously matching the identification information of the matching electronic label, the product information registration unit 253 updates the product identification information matching the identification information of the corresponding electronic label. Additionally, the product information registration unit 253 processes the product information corresponding to the updated product identification information to be transmitted to the corresponding electronic label. The first case in which the product identification information identified in the product identification unit 230 is different from the product identification information previously matching the identification information of the matching electronic label may be a case in which the displayed product is replaced. When most of the pieces of product identification information extracted from the product images for each product extracted from the image received from the moving device are different from the product identification information previously matching the identification information of the electronic label, the displayed product may be determined to have been replaced. In this case, the product information registration unit 253 updates the product identification information matching the identification information of the corresponding electronic label in the management database of the memory 260. Additionally, the product information registration unit 253 extracts the product information of the product having the product identification information updated in the management database of the memory 260, and processes the product information to be transmitted to the corresponding electronic label. Accordingly, the updated product information may be displayed on the electronic label.

According to an additional aspect, the electronic label management apparatus may further include an electronic label identification unit 210. The electronic label identification unit 210 recognizes the identification information of the electronic label from a label image obtained by photographing the electronic label, among the images received from the communication unit 240. The electronic label identification unit 210 searches for the label image obtained by photographing the electronic label, among the received images, and cuts the image including the identification information of the electronic label from the retrieved label image. The identification information of the electronic label is usually indicated by a barcode attached to a portion of a front surface of the electronic label. The electronic label identification unit 210 may correct by rotating the cut barcode image and correct the distortion of the barcode image, and then recognize the barcode to extract the identification information of the electronic label.

According to still another aspect, the electronic label management apparatus may receive the captured image from the moving device and also receive the recognized identification information of the electronic label from the image. In the embodiment according to this aspect, the moving device detects the barcode portion including the identification information of the electronic label from the captured image. The management server receives the identification information of the electronic label and the product images in the vicinity of the electronic label through the communication unit 240. The electronic label management apparatus according to the present embodiment does not require the electronic label identification unit 210. As another example, the moving device may include a radio-frequency identification (RFID) reader, and may read an RFID attached to the electronic label to obtain the identification information of the electronic label.

According to an additional aspect, the electronic label management apparatus may further include a display state management unit 290. In the present embodiment, when some pieces of product identification information, which are different from the product identification information matching the identification information of the electronic label, among the pieces of product identification information output from the product identification unit 230, are found, the display state management unit 290 transmits a warning message to the terminal of the store manager. The second case in which the product identification information identified in the product identification unit 230 is different from the product identification information previously matching the identification information of the matching electronic label may be a case in which the displayed product is moved from a place in which it should have been to another location, for example, may be a case in which a customer picks up the product and places the product in a different location. In this case, many pieces of product identification information that are identical to the product identification information matching the identification information of the electronic label are found, and only a relatively small number of pieces of product identification information that are different from the product identification information matching the identification information of the electronic label are found. The display state management unit 290 extracts a location of the display stand on which the corresponding electronic label is present from the registration information of the electronic label. Subsequently, a management message including information of the location, the identification information of the misplaced product, and the original entire captured image including the segmented images of the product may be generated and transmitted to the terminal of the store manager.

According to yet another aspect, the product identification unit 230 may recognize and output the number of the products from the product image captured in the vicinity of the product in which the electronic label is present in addition to the product identification information. The product identification unit 230 first identifies the products from the received image and segments each product to extract the plurality of product images. Subsequently, the product identification unit 230 processes the images of each product to extract the product identification information. The number of images having the same product identification information may be matched with the product identification information and may be output. In this case, the information output by the product identification unit 230 may be in the form of the electronic label identification information, the product identification information, and product quantity.

According to an additional aspect, the electronic label management apparatus may further include an inventory management unit 270. In the present embodiment, the inventory management unit 270 updates an inventory database on the basis of the product quantity for each product output from the product identification unit 230. When all the products matching the electronic labels of each display stand in the entire store and information of the product quantity are collected, the inventory management unit 270 collects all product quantities for the same products to calculate an inventory amount for each product.

According to yet another aspect, the label information management unit 250 may include an electronic label assignment unit 251. When the product identification information is not assigned to the electronic label, the electronic label assignment unit 251 matches and assigns the product identification information identified in the product identification unit 230 with the identification information of the corresponding electronic label, and processes the product information corresponding to the assigned product identification information to be transmitted to the corresponding electronic label. As described above, when the product identification information is not assigned to the electronic label, there is no product identification information matching the electronic label identification information received through the communication unit 240. In still another embodiment, the electronic label identification information may be information output from the electronic label identification unit 210. When the identified electronic label is in an unassigned state, the electronic label assignment unit 251 matches and stores the product identification information identified in the product identification unit 230 with the identification information of the corresponding electronic label to process the assignment of the corresponding electronic label. The electronic label management apparatus processes the assignment using the database and then transmits the product information corresponding to the assigned product identification information to the corresponding electronic label, and processes so as to display the product information of the product assigned to the corresponding electronic label.

Figure 3:
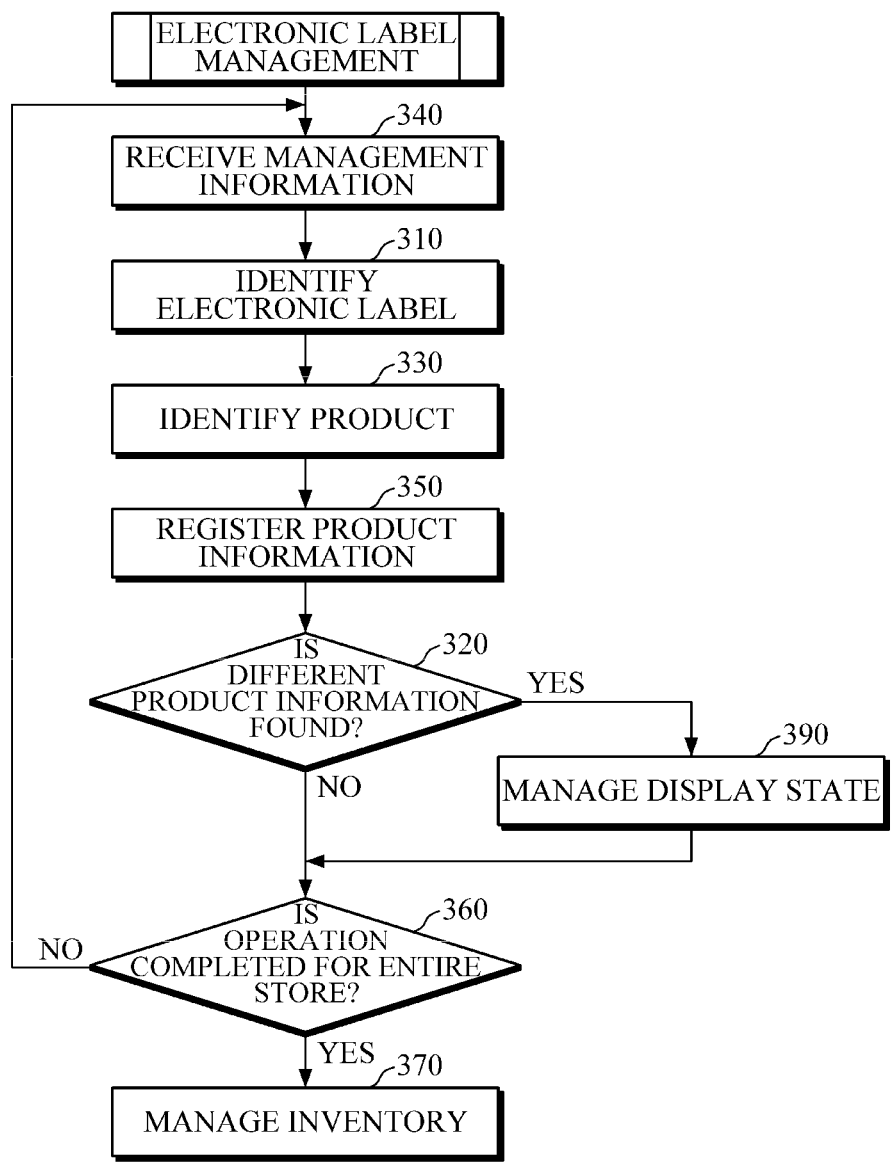
FIG. 3 is a flowchart illustrating a procedure of an electronic label management method according to an embodiment.

FIG. 3 is a flowchart illustrating a procedure of an electronic label management method according to an embodiment. The electronic label management method according to the embodiment may be implemented as a computer program executable on a computer which is connected to a moving device and a plurality of electronic labels via a wired and/or wireless network.

Referring to FIG. 3, the electronic label management method according to the embodiment includes a management information reception operation 340, a product identification operation 330, and a product information registration operation 350. In the management information reception operation 340, the management server receives images captured by the moving device from the moving device. In the product identification operation 330, the management server recognizes product identification information from product images which are captured in the vicinity of an electronic label, among the images received from the moving device and matches the product identification information with identification information of the electronic label to output the product identification information. A detailed description of the product identification operation 330 will be given with reference to FIG. 4.

Referring to FIG. 3, in the product information registration operation 350, when the product identification information identified in in the product identification operation 330 is different from the product identification information previously matching the identification information of the matching electronic label, the management server updates the product identification information matching the identification information of the corresponding electronic label. Additionally, in the product information registration operation 350, the management server processes the product information corresponding to the updated product identification information to be transmitted to the corresponding electronic label. The first case of the cases in which the product identification information identified in the received image is different from the product identification information previously matching the identification information of the matching electronic label may be a case in which the displayed product is replaced. When most of the pieces of product identification information extracted from the product images for each product extracted from the image received from the moving device are different from the product identification information previously matching the identification information of the electronic label, the displayed product may be determined to have been replaced. In this case, the management server updates the product identification information matching the identification information of the corresponding electronic label in the management database. Additionally, in the product information registration operation 350, the management server extracts the corresponding product information from a product information database and processes the updated product information to be transmitted to the electronic label. Accordingly, the updated product information may be displayed on the electronic label.

According to another aspect, the electronic label management method may further include an electronic label identification operation 310. In the electronic label identification operation 310, the management server recognizes the identification information of the electronic label from a label image obtained by photographing the electronic label, among the images received from the moving device. The management server searches for the label image obtained by photographing the electronic label, among the received images, and cuts the image including the identification information of the electronic label from the retrieved label image. The identification information of the electronic label is usually indicated by a barcode attached to a portion of a front surface of the electronic label. In the electronic label identification operation 310, the management server may correct by rotating the cut barcode image and correct the distortion of the barcode image, and then recognize the barcode to extract the identification information of the electronic label.

According to still another aspect, the electronic label management apparatus may receive the image captured from the moving device and also receive the identification information of the electronic label recognized from the received image. In the embodiment according to this aspect, the moving device detects the barcode portion including the identification information of the electronic label from the captured image. In the present embodiment the management server receives the identification information of the electronic label and the product image in the vicinity of the electronic label from the moving device.

According to yet another aspect, the electronic label management method may further include a display state management operation 390. In the present embodiment, when some pieces of product identification information, which are different from the product identification information matching the identification information of the electronic label, among the pieces of product identification information matching a specific electronic label output in the product identification operation 330, are found, the management server transmits a warning message to the terminal of the store manager. The second case of the cases in which the product identification information identified in the product identification operation 330 is different from the product identification information previously matching the identification information of the matching electronic label may be a case in which the displayed product is moved from a place in which it is should have been to another location, for example, may be a case in which a customer picks up the product and places the product in a different location. In this case, many pieces of product identification information that are identical to the product identification information matching the identification information of the electronic label are found, and only a relatively small number of pieces of product identification information that are different from the product identification information matching the identification information of the electronic label are found. The management server extracts a location of the display stand on which the corresponding electronic label is present from the registration information of the electronic label. Subsequently, a management message including information of the location, the identification information of the misplaced product, and the original entire captured image including the segmented images of the product may be generated and transmitted to the terminal of the store manager.

According to an additional aspect, the electronic label management method may further include an inventory management operation 370. When the moving device goes around the entire store and operations 340, 310, 330, 350, 320, and 390 are completed for the electronic labels of the display stands in the entire store, all the pieces of product identification information in the entire store are extracted (operation 360). In this case, the management server updates the inventory database on the basis of the product quantity for each product output in the product identification operation 330. When all the products matching the electronic label of each display stand in the entire store and information of the product quantity are collected, the management server collects all product quantities for the same products to calculate an inventory amount for each product.

Figure 4:
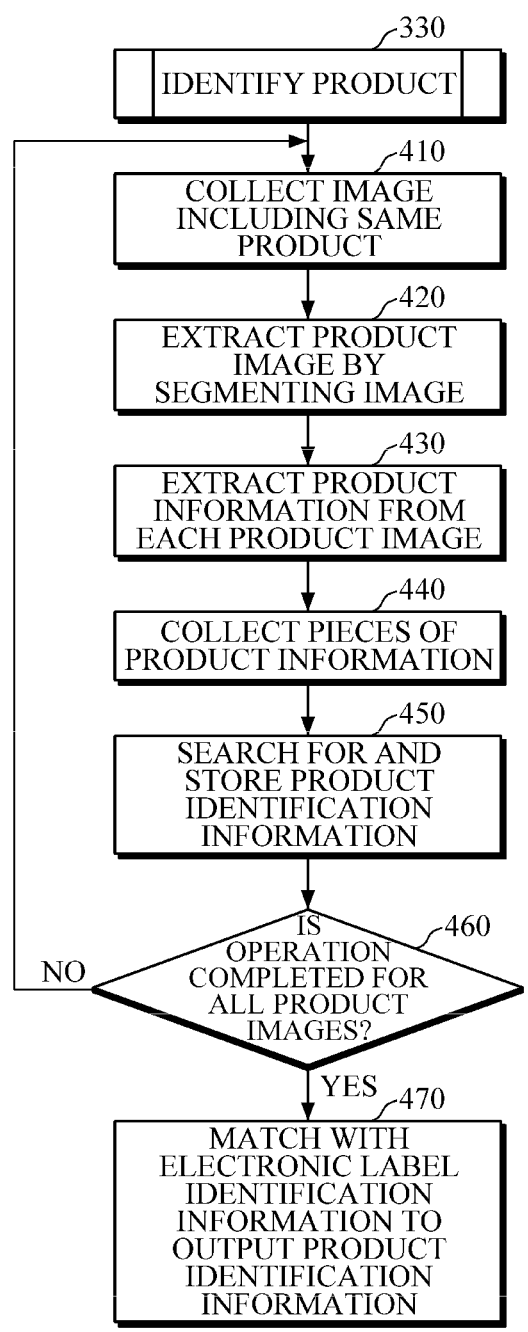
FIG. 4 is a flowchart illustrating a procedure of an example of a product identification operation of FIG. 3.

FIG. 4 is a flowchart illustrating a procedure of an example of the product identification operation 330 of FIG. 3.

First, a product photographing method applicable to the illustrated embodiment will be described. When photographing the product, the moving device photographs the product so that the same location is found, for example, in three photographs. That is, the moving device photographs the product each time the camera moves ⅓ of the actual distance of the width of the image to be captured. In this way, images which are captured from the left, center, and right of a specific product may be obtained. In this case, one image may be divided into three segments in a width direction and processed. A plurality of cameras may be installed in the moving device to be arranged in a height direction so as to have a similar overlapping photographing range in a height direction of the shelf of the display stand, and the plurality of cameras arranged in the height direction may simultaneously photograph. Therefore, images which are captured from above and below one product may also be obtained. The management server buffers the images received from the moving device. In order to identify the product, one of the images received from the moving device is first divided into 3×3 and then processed based on a block in the middle thereof. The focus is on one of the products included in the middle block. It is highly probable that the images obtained by photographing the product are an image received immediately before and an image received immediately after.

Referring to FIG. 4, in the product identification operation 330, the management server collects the images including the same product of interest (operation 410). For example, the moving device may mark and transmit information that can identify the same product of interest in the captured images on the image. Since the moving device photographs while moving, it is possible to mark the same point in the captured image using a moved distance while photographing and using a distance from the camera to the product. Assuming that the product did not move while being consecutively photographed, the images of the same product of interest may be collected from the above information without recognizing the actual image. As another example, the same point may be determined in two images in consideration of the photographing cycle and photographing speed of the moving device.

Subsequently, in each of the collected images, a boundary of the product of interest is recognized and the product image is segmented. In this case, each product image includes a portion of a type of the product of interest (operation 420). Subsequently, the product information is extracted from each of the product images obtained by photographing the same product of interest at different angles (operation 430). For example, the extracted product information may include a portion of text printed on the packaging of the product of interest. As another example, the extracted product information may be a graphic or image printed on the packaging of the product. As still another example, the extracted product information may be in the form of a product. In this way, the pieces of product information extracted from each product image are collected (operation 440). For example, it is possible to generate text information extracted from a wider range by connecting text extracted from each of the product images captured at different viewpoints, except for overlapping portions. As another example, it is possible to generate graphic images in a wider range by connecting graphic images extracted from each of the product images captured at different viewpoints, except for overlapping portions. Subsequently, by searching the product information database with the collected product information, the identification information of the product including the product information is extracted (operation 450). Through the above processes, identification information of one product of interest included in one image is extracted. Subsequently, the process is repeated for all the products included in the block in the middle of the corresponding image (operation 460). When the extraction of the product identification information for all the products included in the block in the middle of the corresponding image is completed, the pieces of extracted product identification information are output by matching the identification information of the electronic label corresponding to the image (operation 470). In the embodiment illustrated in FIG. 4, the images obtained by photographing the specific product at various angles, for example, from the left and right, above and below, and the center, are used, and thus a recognition rate is increased.

As still another example, in the product identification operation 330, the product may be identified in all of a plurality of segmentation images obtained by photographing the same product and the results thereof may be compared so that the product identification information may be determined. For example, as in the embodiment illustrated in FIG. 4, when the moving device transmits images captured to overlap in width and height directions, nine images including one product may be obtained. The product identification information may be determined for each product image by recognizing the product information from each of the product images extracted by segmenting the corresponding product portion of interest from the nine images, and by searching the product information database with the product information. When all of the nine pieces of product identification information determined as described above are the same, the nine pieces of product identification information may be determined as the product identification information of the product. Even when some of the nine pieces of product identification information are different, for example, when there is only one piece of different product identification information, it is possible to ignore the product identification information and determine the product identification information of the corresponding product image. However, when the number of pieces of different product identification information is a certain number or more, it may be determined that recognition has failed.

According to an additional aspect, in the product identification operation 330, the product identification information may be determined using artificial intelligence. For example, a CNN is trained in advance with many images obtained by photographing the product at various angles and with the product identification information. The product identification information may be determined by inputting a product image of a product of interest extracted from the image received from the moving device into the CNN. When the CNN is trained with the images obtained by photographing all or part of the products to be displayed at various angles and with the identification information of the images, the products that are excluded from the display are learned and classified in a limited domain, and thus reliability of classification may be increased. The CNN may use the product image for each product extracted from the image received from the moving device as an input and thus may output a probability of matching the product identification information.

Figure 5:
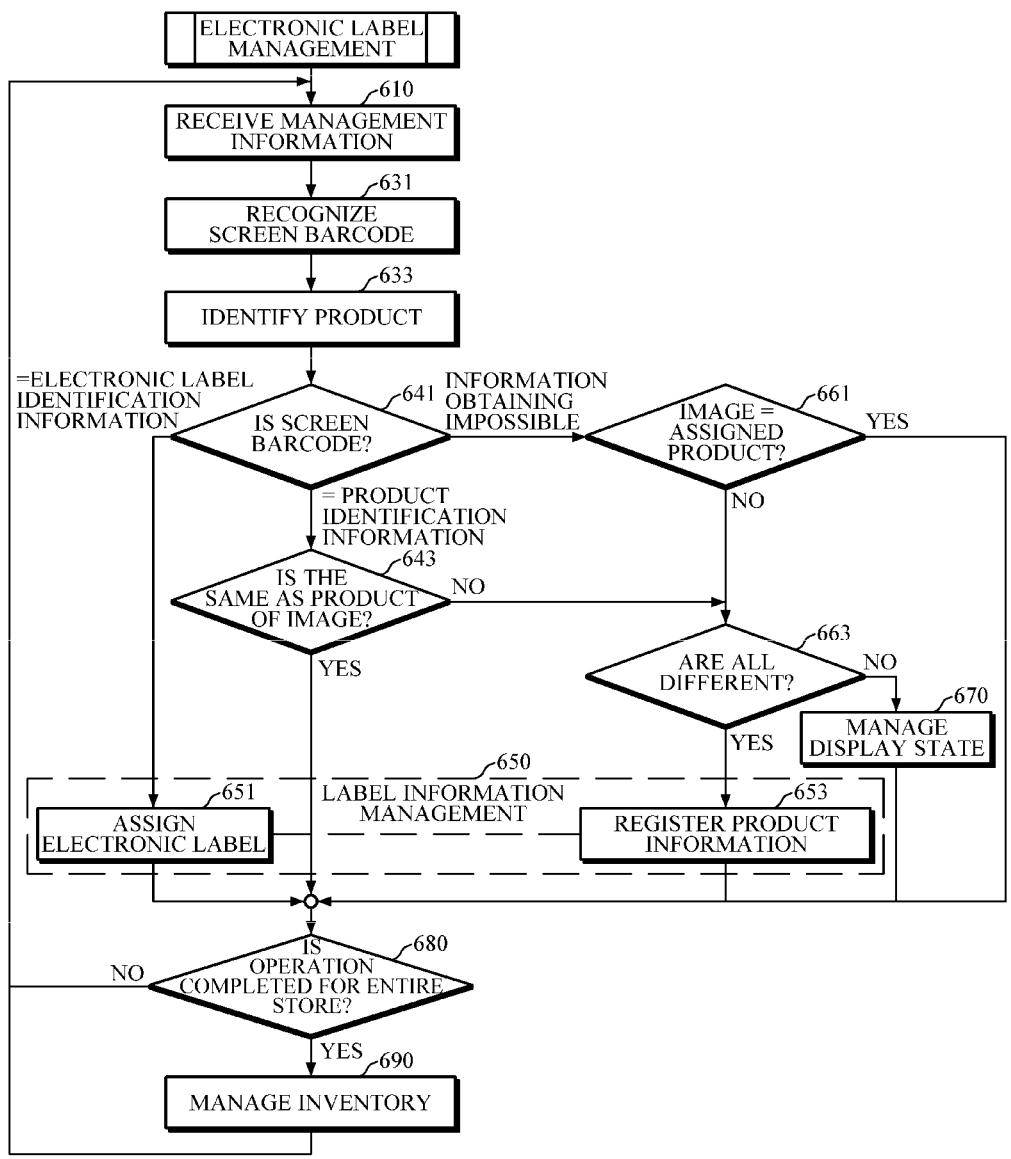
FIG. 5 is a flowchart illustrating a procedure of an electronic label management method according to another embodiment.

FIG. 5 is a flowchart illustrating a procedure of an electronic label management method according to another embodiment.

Referring to FIG. 5, the electronic label management method according to another embodiment includes a management information reception operation 610, a product identification operation 633, and an identification information determination operation 641. In the management information reception operation 610, the management server receives images captured by the moving device from the moving device. Subsequently, in the illustrated embodiment, a screen barcode recognition operation 631 may be performed. The management server selects an image on which a screen displayed on an electronic paper display of the electronic label is captured from one received image or a plurality of received images, and determines whether the barcode is included in the image displayed on the screen. When the barcode is included, the barcode region is extracted and recognized. In the product identification operation 633, the management server recognizes product identification information from product images which are captured in the vicinity of an electronic label, among the images received from the moving device, and matches the product identification information to identification information of the electronic label to output the product identification information. For example, in the product identification operation 633, according to the method illustrated in FIG. 4, the product may be identified from the received image and output.

Subsequently, in the identification information determination operation 641, the management server determines what information is code information of a screen barcode. According to the determination result, a label information management operation 650 may be performed. In the label information management operation 650, the management server updates the product identification information matching the identification information of the corresponding electronic label using the product identification information identified in the product identification operation 633, and processes the product information corresponding to the updated product identification information to be transmitted to the corresponding electronic label.

According to an aspect, the label information management operation 650 may include an electronic label assignment operation 651. In the illustrated embodiment, when the barcode displayed on the screen in operation 641 is the identification information of the electronic label, the electronic label assignment operation 651 is performed. When the product identification information is assigned to the electronic label, the electronic label indicates the barcode of the assigned product information, but when the product identification information is not assigned to the electronic label, the electronic label indicates the barcode of the electronic label identification information of the electronic label itself. The product information and the electronic label information may be set to have different formats and may be distinguished from each other. It can be seen that the electronic label is in an unassigned state when the screen barcode indicates the electronic label identification information.

In the electronic label assignment operation 651, since the product identification information is not assigned to the electronic label, the management server matches and assigns the product identification information identified in the product identification operation 633 with the identification information of the corresponding electronic label, and processes the product information corresponding to the assigned product identification information to be transmitted to the corresponding electronic label. As described above, when the product identification information is not assigned to the electronic label, there is no product identification information matching the electronic label identification information.

When the identified electronic label is in an unassigned state, the management server matches and stores the product identification information identified in the product identification operation 633 with the identification information of the corresponding electronic label to process the assignment of the corresponding electronic label. The management server processes the assignment using the database and then transmits the product information corresponding to the assigned product identification information to the corresponding electronic label, and processes so as to display the product information of the product assigned to the corresponding electronic label.

According to still another aspect, the label information management operation 650 may include a product information registration operation 653. In the illustrated embodiment, when the barcode displayed on the screen in operation 641 is the product identification information, the corresponding electronic label has already been matched with the product information and the assignment has been completed. In this case, the management server compares the product identification information obtained through the barcode with the product identification information obtained by recognizing the image in the product identification operation 633 (operation 643). When the two pieces of identification information are the same, it is determined that the electronic label is in a normal state because the product information corresponding to the displayed product is displayed on the electronic label.

When any of the pieces of product identification information obtained by recognizing the image in the product identification operation 633 is different from the product identification information obtained through the barcode, it is determined whether all or most of the pieces of product identification information are different, or are only a small number, for example, are less than or equal to a reference number (operation 663). When all or most of the pieces of product identification information obtained by recognizing the image are different from the product identification information obtained through the barcode, this means that the displayed product has been replaced for some reason. In this case, the management server performs the product information registration operation 653 to update the product identification information matching the identification information of the corresponding electronic label. Additionally, in the product information registration operation 653, the management server processes the product information corresponding to the updated product identification information to be transmitted to the corresponding electronic label. Accordingly, the updated product information may be displayed on the electronic label.

According to an additional aspect, the electronic label management method may further include a display state management operation 670. In the present embodiment, when some pieces of product identification information, which are different from the product identification information matching the identification information of the electronic label, among the pieces of product identification information matching a specific electronic label output in the product identification operation 633, are found, the management server transmits a warning message to the terminal of the store manager. The above case may be a case in which the displayed product is moved from a place in which it should have been to another location, for example, may be a case in which a customer picks up the product and places the product in a different location. In this case, many pieces of product identification information that are identical to the product identification information matching the identification information of the electronic label are found, and only a relatively small number of pieces of product identification information that are different from the product identification information matching the identification information of the electronic label are found. The management server extracts a location of the display stand on which the corresponding electronic label is present from the registration information of the electronic label. Subsequently, a management message including information of the location, the identification information of the misplaced product, and the original entire captured image including the segmented images of the product may be generated and transmitted to the terminal of the store manager.

According to an additional aspect, the electronic label management method may further include an inventory management operation 690. When the moving device goes around the entire store and the determination of whether the assigned products is the displayed product is completed for the electronic labels of the display stands in the entire store, all the pieces of product identification information in the entire store are integrated and processed (operation 680). In this case, the management server updates the inventory database on the basis of the product quantity for each product output in the product identification operation 633. When all the products matching the electronic label of each display stand in the entire store and information of the product quantity are collected, the management server collects all product quantities for the same products to calculate an inventory amount for each product.

According to the proposed invention, it is possible to reduce employment costs and time associated with information registration of an electronic label. Further, it is possible to reduce human resources for inventory management or display state management.

While the present invention has been described with reference to the embodiments and drawings, the present invention is not limited thereto. It should be understood that various modifications from the embodiments may be apparent to those skilled in the art. Appended claims are intended to include such modifications.

What is claimed is:

1. An electronic label management apparatus comprising:
a communication unit configured to receive management information including captured images;
a product identification unit configured to identify a product from product images captured in the vicinity of an electronic label among the images received from the communication unit, match the product with identification information of the electronic label, and output result; and
a label information management unit configured to update product identification information matching the identification information of the corresponding electronic label using product identification information output from the product identification unit and process product information corresponding to the updated product identification information to be transmitted to the corresponding electronic label,
wherein, when the product image extracted from the captured images includes a portion of the product, the product identification unit searches for an image including an entire shape of the product which comprises the portion of the product.

2. The electronic label management apparatus of claim 1, wherein the label information management unit includes a product information registration unit configured to update the product identification information matching the identification information of the corresponding electronic label and process the product information corresponding to the updated product identification information to be transmitted to the corresponding electronic label when the product identification information identified in the product identification unit is different from the product identification information matching the identification information of the matching electronic label.

3. The electronic label management apparatus of claim 1, wherein the product identification unit includes an artificial intelligence image recognition unit trained using images obtained by photographing the corresponding product at various angles.

4. The electronic label management apparatus of claim 1, further comprising an electronic label identification unit configured to recognize the identification information of the electronic label from a label image obtained by photographing the electronic label, among the images received from the communication unit.

5. The electronic label management apparatus of claim 1, wherein the communication unit receives the captured images from a moving device and the identification information of the electronic label recognized from the received image.

6. The electronic label management apparatus of claim 5, wherein the moving device is a cart including a camera, a traveling robot, or a flying object.

7. The electronic label management apparatus of claim 1, further comprising an inventory management unit configured to update an inventory database on the basis of a product quantity for each product output from the product identification unit.

8. The electronic label management apparatus of claim 1, further comprising a display state management unit configured to transmit a warning message to a terminal of a store manager when some pieces of product identification information, which are different from the product identification information matching the identification information of the electronic label, among the pieces of product identification information output from the product identification unit, are found.

9. The electronic label management apparatus of claim 1, wherein the label information management unit includes an electronic label assignment unit configured to match and assign the product identification information identified in the product identification unit with the identification information of the corresponding electronic label, and process the product information corresponding to the assigned product identification information to be transmitted to the corresponding electronic label when the product identification information is not assigned to the electronic label.

* * * * *